United States Patent
Ge et al.

(10) Patent No.: US 7,309,253 B2
(45) Date of Patent: Dec. 18, 2007

(54) BATTERY COVER FIXING MECHANISM AND BATTERY COVER AND HOUSING ASSEMBLY

(75) Inventors: Peng-Jing Ge, ShenZhen (CN); Xing-Huang Luo, ShenZhen (CN); Rui-Hao Chen, ShenZhen (CN); Ye Liu, ShenZhen (CN); Shui-Yuan Qin, ShenZhen (CN); Hsiao-Hua Tu, Tu-cheng (TW)

(73) Assignees: Shenzhen Futaihong Precision Industrial Co., Ltd., Baoan District, Shenzhen, Guangdong (CN); Sutech Trading Limited, Tortola (VG)

( * ) Notice: Subject to any disclaimer, the term of this patent is extended or adjusted under 35 U.S.C. 154(b) by 65 days.

(21) Appl. No.: 11/265,572

(22) Filed: Nov. 2, 2005

(65) Prior Publication Data

US 2006/0115715 A1    Jun. 1, 2006

(30) Foreign Application Priority Data

Nov. 27, 2004   (CN) .................... 2004 2 0102003

(51) Int. Cl.
*H01R 3/00*   (2006.01)

(52) U.S. Cl. ........................... 439/500; 429/97
(58) Field of Classification Search ................ 439/500; 429/97, 100

See application file for complete search history.

(56) References Cited

U.S. PATENT DOCUMENTS

| | | | |
|---|---|---|---|
| 5,607,791 A * | 3/1997 | Garcia et al. ................. | 429/96 |
| 5,895,729 A * | 4/1999 | Phelps, III et al. ........... | 429/97 |
| 6,171,138 B1 * | 1/2001 | Lefebvre et al. ............ | 439/500 |
| 7,077,692 B2 * | 7/2006 | Chintala ..................... | 439/500 |
| 2004/0229114 A1* | 11/2004 | Liang et al. ................ | 429/100 |
| 2005/0130030 A1* | 6/2005 | Watanabe et al. ........... | 429/100 |

* cited by examiner

*Primary Examiner*—Thanh-Tam Le
(74) *Attorney, Agent, or Firm*—Morris Manning Martin LLP; Tim Tingkang Xia, Esq.

(57) ABSTRACT

A battery cover fixing mechanism is provided for coupling a cover (1) to a housing (2) of a portable electronic device. The battery cover fixing mechanism includes a blocking mechanism, an opening (16), a latching mechanism, a slot (20) and a cutout (24). The cover forms the blocking mechanism and defines the opening. The housing defines the slot and the cutout. The latching mechanism includes a block (30), an elastic member (32), a slider (34) having a blocking part, and a holder (36) fixed to the housing. The slider is slidably attached on the holder. The block is fixed on the slider and extends through the cutout and the opening. The blocking mechanism of the cover engages in the slot of the housing and with the blocking part of the slider. Two ends of the elastic member are respectively attached to the holder and the slider.

20 Claims, 5 Drawing Sheets

BATTERY COVER FIXING MECHANISM AND BATTERY COVER AND HOUSING ASSEMBLY

FIELD OF THE INVENTION

The present invention generally relates to battery cover assemblies, and more particularly to a battery cover fixing mechanism and a battery cover and housing assembly for use in a portable electronic device.

GENERAL BACKGROUND

Batteries are widely used in portable electronic devices such as personal digital assistants (PDAs) and cellphones. A battery is generally removably mounted in a receptacle of a housing of an electronic device. The receptacle is generally covered by a battery cover. When the battery is damaged or dead or needs to be recharged, the cover is removed from the housing, whereupon the battery can be taken out and later replaced.

A fixing mechanism is generally employed in a conventional battery cover, to engage with a housing of the portable electronic device. For example, a battery cover of an Alcatel® OT310 cellphone comprises a fixing mechanism. The fixing mechanism comprises a pair of hooks arranged at a lower end of the battery cover, and a locking pin arranged at an upper end of the battery cover. Correspondingly, a pair of slots is defined at a lower end of a back side of the housing, and a locking hole is defined at an upper end of the back side. In assembly, the hooks are inserted into the corresponding slots. Then, the battery cover is pressed downwardly such that the locking pins of the battery cover are inserted into the corresponding locking holes of the housing. The battery cover is thus assembled to the housing of the cellphone. The battery cover is simple in structure, and the engagement between the battery cover and the housing of the cellphone is secure. However, during disassembly of the cover from the housing of the cellphone, the battery cover is liable to be damaged because great force has to be exerted on the battery cover to detach the battery cover from the housing. As a result, it can be inconvenient for a user to change a battery.

Referring to FIG. 1, this shows another fixing mechanism, which is used to fix a battery 104' onto a back side of a cellphone housing 102'. The fixing mechanism includes a hook 106', a spring 108', and a slot 112'. The hook 106' includes an operating portion 114', an accepting portion 116', and a protrusion 110'. The hook 106' is movably assembled to the back side of the cellphone housing 102'. The spring 108' is disposed around the accepting portion 116', and lies between the cellphone housing 102' and the hook 106'. The slot 112' is defined in the battery 104'. The protrusion 110' is located in the slot 112' to fix the battery 104'. When the battery 104' needs to be installed into the cellphone housing 102', the battery 104' is pressed into the cellphone housing 102'. The hook 106' is caused to move lengthwise in a first direction along the cellphone housing 102', and the spring 108' is compressed. Eventually, the hook 106' reaches the slot 112'. The spring 108' rebounds, and the hook 106' moves lengthwise in an opposite second direction along the cellphone housing 102'. Thus the protrusion 110' snappingly engages in the slot 112', and the battery 104' is firmly fixed in the cellphone housing 102'. When the battery 104' needs to released from the cellphone housing 102', the operating portion 114' is pressed in the first direction. Then the spring 108' is compressed, and the hook 106' disengages from the slot 112'. The battery 104' can then be readily released. However, the fixing mechanism uses up extra space in the cellphone housing 102'. The needed extra space may result in the cellphone being unduly large.

What is needed, therefore, is a new battery cover fixing mechanism for a portable electronic device which makes it convenient for a user to detach a battery cover from a housing of the portable electronic device, and which occupies minimal space of the housing of the portable electronic device.

SUMMARY

A battery cover fixing mechanism for a portable electronic device is provided. In a preferred embodiment, the cover couples to a housing of an electronic device by the battery cover fixing mechanism. The battery cover fixing mechanism includes a blocking mechanism, an opening, a latching mechanism, a slot and a cutout. The blocking mechanism is formed on the cover. The opening is defined in the cover. The latching mechanism includes a block, an elastic member, a slider having a blocking part, and a holder. The slot and the cutout are defined in the housing. The holder is fixed to the housing, the slider is slidably attached on the holder, the block is fixed on the slider and extends through the cutout and the opening so as to be exposed to a user, the blocking mechanism of the cover engages in the slot of the housing and with the blocking part of the slider, one end of the elastic member is attached to the holder, and an opposite end of the elastic member is attached to the slider.

A battery cover and housing assembly for a portable electronic device is provided. The battery cover and housing assembly includes a housing, a cover, and a latching mechanism. The housing has a slot and a cutout thereon. The cover has a blocking mechanism and an opening. The latching mechanism includes a block, an elastic member, a slider having a blocking part, and a holder. The holder is fixed to the housing, the slider is slidably attached on the holder, the block is fixed on the slider and extends through the cutout and the opening so as to be exposed to a user, the blocking mechanism of the cover engages in the slot of the housing and with the blocking part of the slider, one end of the elastic member is attached to the holder, and an opposite end of the elastic member is attached to the slider.

A main advantage of the battery cover fixing mechanism is that all the elements of the battery cover fixing mechanism are integrated together, to be a whole. Therefore, the battery cover fixing mechanism is steady. In addition, the battery cover is convenient to open and close. The cover can be released from the housing easily and conveniently just by pushing the block. Furthermore, the mechanism occupies a little space and will not waste space for the holder and the slider are very thin.

Other advantages and novel features will become more apparent from the following detailed description when taken in conjunction with the accompanying drawings, in which:

DETAILED DESCRIPTION OF THE PREFERRED EMBODIMENTS

Figure 1:
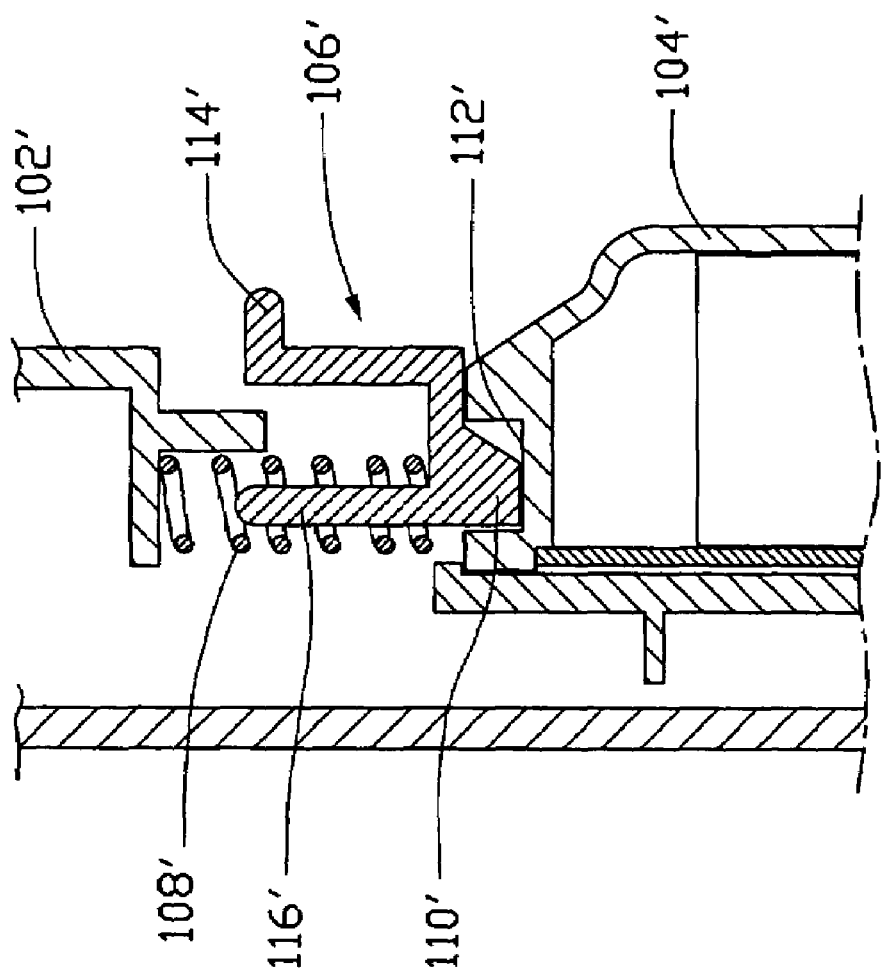
FIG. 1 is a cross-sectional view of a conventional battery cover fixing mechanism of a housing, together with part of a battery.
Figure 2:
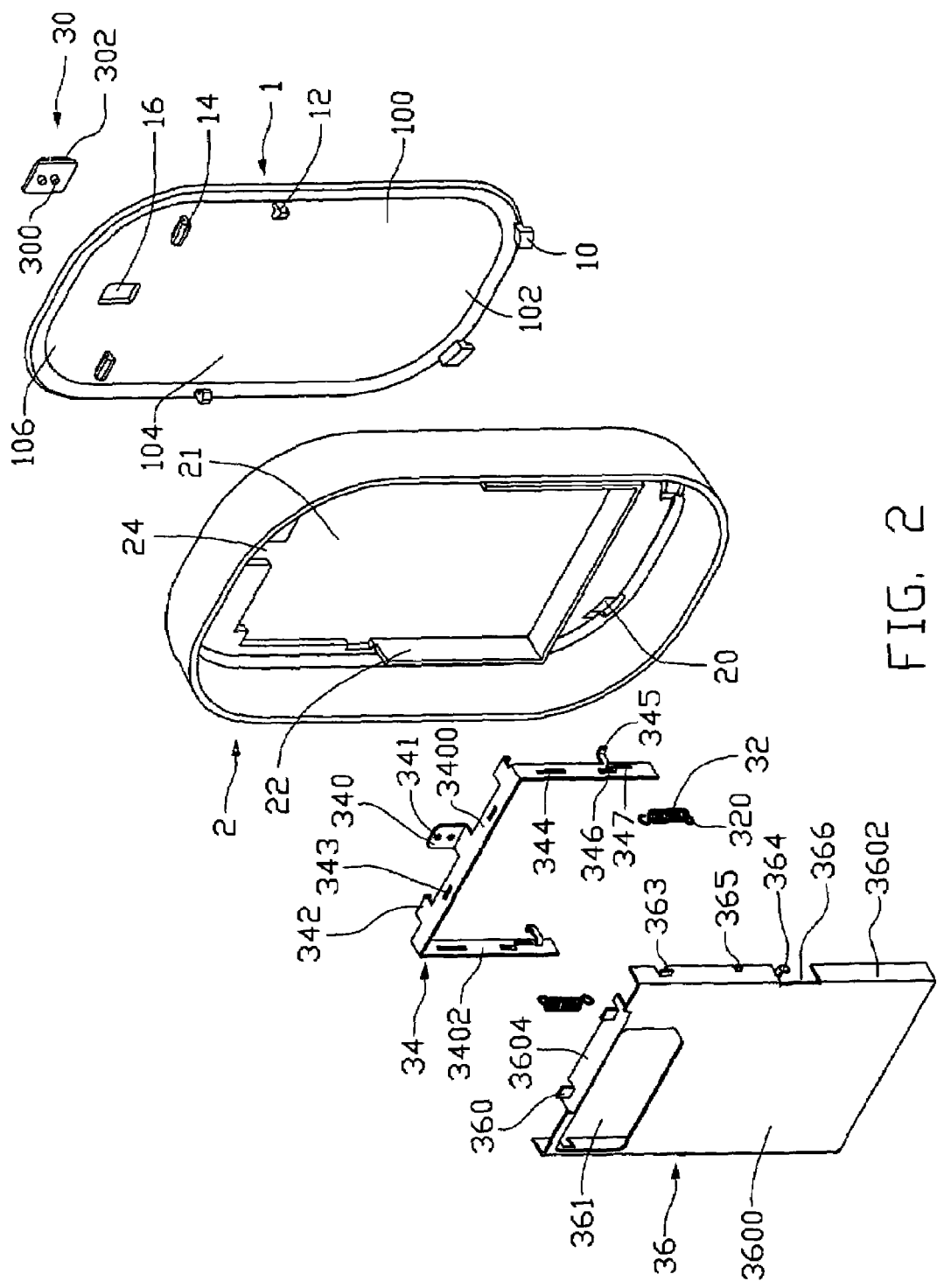
FIG. 2 is an exploded, isometric view of a housing and a cover including a battery cover fixing mechanism in accordance with a preferred embodiment of the present invention.

Referring to FIG. 2, this shows a battery cover fixing mechanism for use in an electronic device like a mobile phone (not shown), in accordance with a preferred embodiment of the present invention. The battery cover fixing mechanism is shown and detailed as follows for the purposes of providing a simple description of the preferred embodiment of the present invention, and the present invention and embodiments thereof are not to be construed as being limited to the following description. The battery cover fixing mechanism is for fixing a cover 1 onto a housing 2, and includes a latching mechanism (not labeled), a blocking mechanism (not labeled), an opening 16, a slot 20 and a cutout 24. The latching mechanism includes a block 30, two springs 32, a sliding frame 34 forming at least two engagement means thereon for the latching mechanism, and a holder 36.

The cover 1 can be a single piece of shaped sheet material. The cover 1 has an inside surface 100. The cover 1 also has a rearward section 102, a central section 104, and a front section 106. The blocking mechanism includes a pair of rearward claws 10, a pair of central claws 12, and a pair of front claws 14 having a different forming orientation from the central claws 12. The rearward claws 10 are symmetrically formed on the inside surface 100 of the cover 1 at the rearward section 102. The central claws 12 symmetrically extend from two opposite edges of the inside surface 100 of the cover 1 at the central section 104. The front claws 14 symmetrically extend from the inside surface 100 of the cover 1 at the front section 106. The opening 16 is defined in the cover 1 between the front claws 14. An end of each central claw 12 and each front claw 14 is chamfered, in order to facilitate installation of the cover 1.

The housing 2 typically contains electric elements such as printed circuit boards (PCBs), and can for example be a part of a cellphone body. A receptacle 21 formed by an opening and an inner space of the housing 2 is defined in the housing 2 to receive a component of the mobile phone like a battery (not shown). The cover 1 covers the receptacle 21. Two slots 20 are symmetrically defined in the housing 2 at one end thereof. The rearward claws 10 of the cover 1 engage in the slots 20. The housing 2 has three sidewalls 22 around the receptacle 21. Said cutout 24 is defined in the housing 2, and faces the slots 20.

Figure 3:
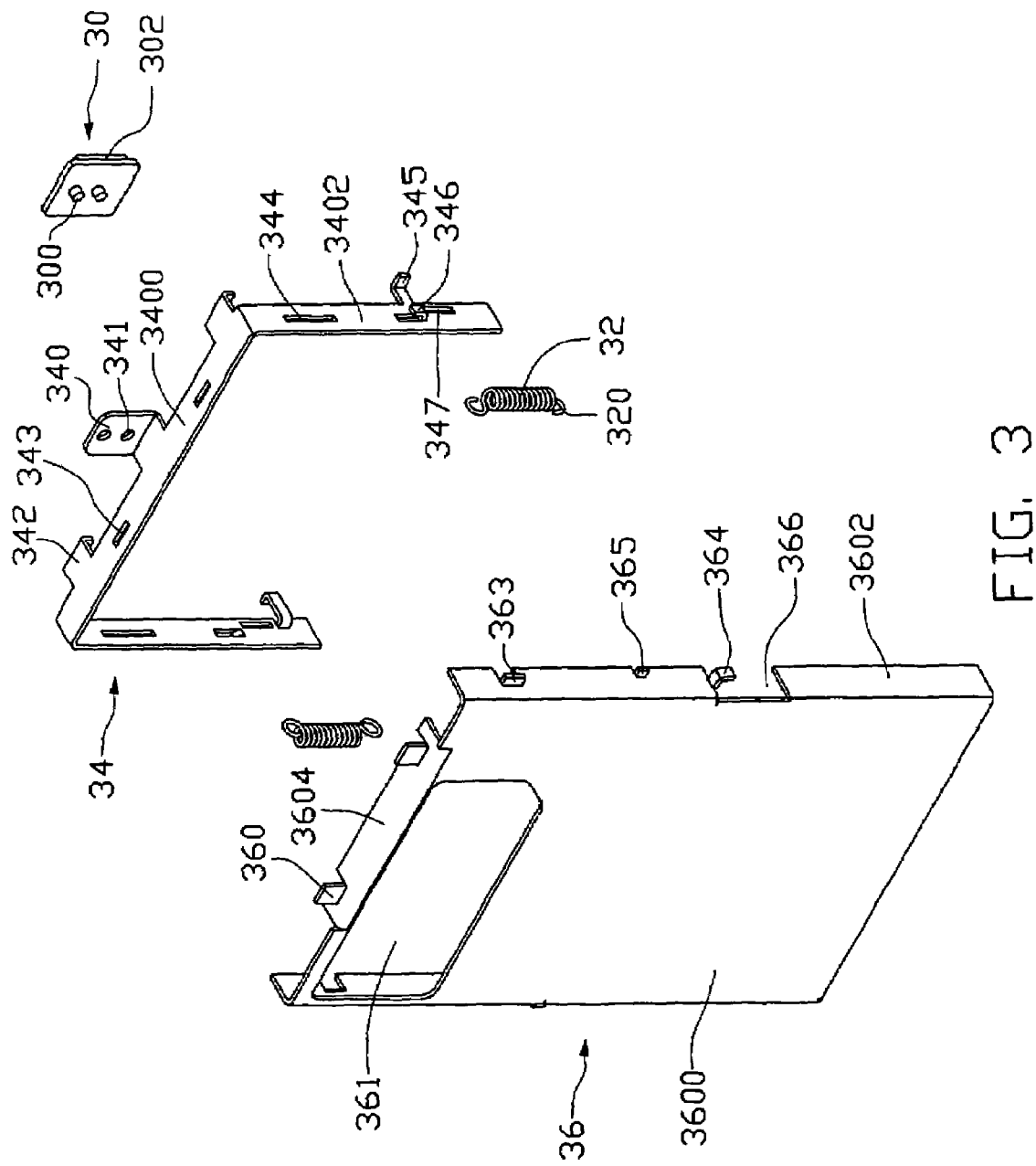
FIG. 3 is an enlarged, exploded, isometric view of a latching mechanism of the battery cover fixing mechanism of FIG. 2.

Referring also to FIG. 3, the block 30 is generally cuboidal. A pair of posts 300 extends from one main surface of the block 30. A projection 302 extends from an opposite main surface of the block 30. The projection 302 is slightly smaller than the opening 16, while the block 30 is larger than the opening 16.

The springs 32 are helical and compressible. Each spring 32 has a hook 320 at each of opposite ends thereof.

The sliding frame 34 has a generally inverted 'U' shape, and is elastic. The sliding frame 34 comprises two opposite side portions 3402, and a transverse portion 3400 perpendicularly interconnecting top ends of the side portions 3402. The sliding frame 34 also comprises a blocking part (not labeled) as the at least two engagement means, which includes two first clasps 342 as a first engagement means and two second clasps 345 as a second engagement means. The second clasps 345 extend from the side portions 3402 respectively. An L-shaped catch piece 340 is formed on the middle of the transverse portion 3400, corresponding to the cutout 24. Two holes 341 are defined in a vertical portion of the catch piece 340. The posts 300 of the block 30 are inserted into the holes 341. The first clasps 342 are symmetrically formed on the transverse portion 3400, and a pair of grooves 343 is symmetrically defined in the transverse portion 3400. Each groove 343 is located between the catch piece 340 and a corresponding first clasp 342. A first track 344 and a second track 347 are defined in each side portion 3402. The first track 344 is adjacent the top end of the side portion 3402 near the transverse portion 3400. The second track 347 is adjacent a bottom end of the transverse portion 3400. A first catch 346 is formed on each side portion 3402 adjoining the second track 347.

The holder 36 includes a generally rectangular plate 3600. Two sidepieces 3602 are perpendicularly bent from two opposite long sides of the plate 3600. A top piece 3604 is perpendicularly bent from a top side of the plate 3600. A pair of inserting pieces 360 is vertically formed on the top piece 3604. An aperture 361 is defined in the plate 3600 for receiving a SIM (subscriber identity module) card. A first tab 363 is formed on an upper portion of each sidepiece 3602. A second tab 365 is formed on each sidepiece 3602 below the first tab 363. An L-shaped second catch 364 is formed on each sidepiece 3602 below the second tab 365. A gap 366 is defined in each sidepiece 3602 immediately below where the second catch 364 adjoins the sidepiece 3602. A vertical portion of the second catch 364 is located opposite an upper portion of the gap 366.

Figure 4:
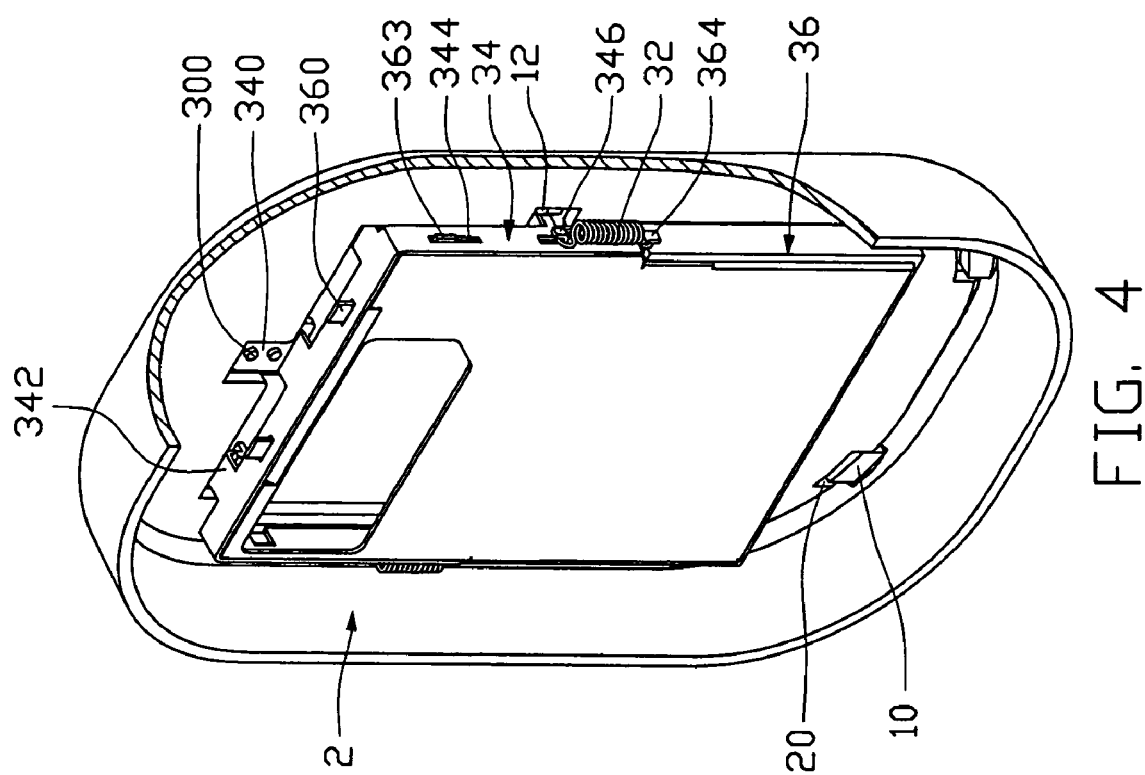
FIG. 4 is an assembled, cut-away view of FIG. 2.

A process of assembling the latching mechanism on the housing 2 is as follows. Referring to FIG. 4, firstly, the holder 36 is fixed to the housing 2 by conventional methods such as adhering or welding. For example, the sidepieces 3602 and a bottom side opposite to the top piece 3604 of the holder 36 are adhered with the sidewalls 22 of the housing 2. Next, the sliding frame 34 is assembled on the holder 36. The transverse portion 3400 and the side portions 3402 of the sliding frame 34 respectively abut the top piece 3604 and the sidepieces 3602 of the holder 36. The inserting pieces 360 of the holder 36 are received in the grooves 343 of the sliding frame 34. The first tracks 344 and the second tracks 347 are respectively longer than the first tabs 363 and the second tabs 365. The first tabs 363 and the second tabs 365 of the holder 36 are slidably received in the first tracks 344 and the second tracks 347 of the sliding frame 34, respectively. Thus, the sliding frame 34 is slidable relative to the holder 36. Then the springs 32 are installed on the sliding frame 34 and the holder 36. The springs 32 are first stretched, and then the hooks 320 of each spring 32 are respectively engaged on one first catch 346 of the sliding frame 34 and one second catch 364 of the holder 36. Finally, the posts 300 of the block 30 are inserted into the holes 341 of the sliding frame 34, to thereby fix the block 30 in place.

Figure 5:
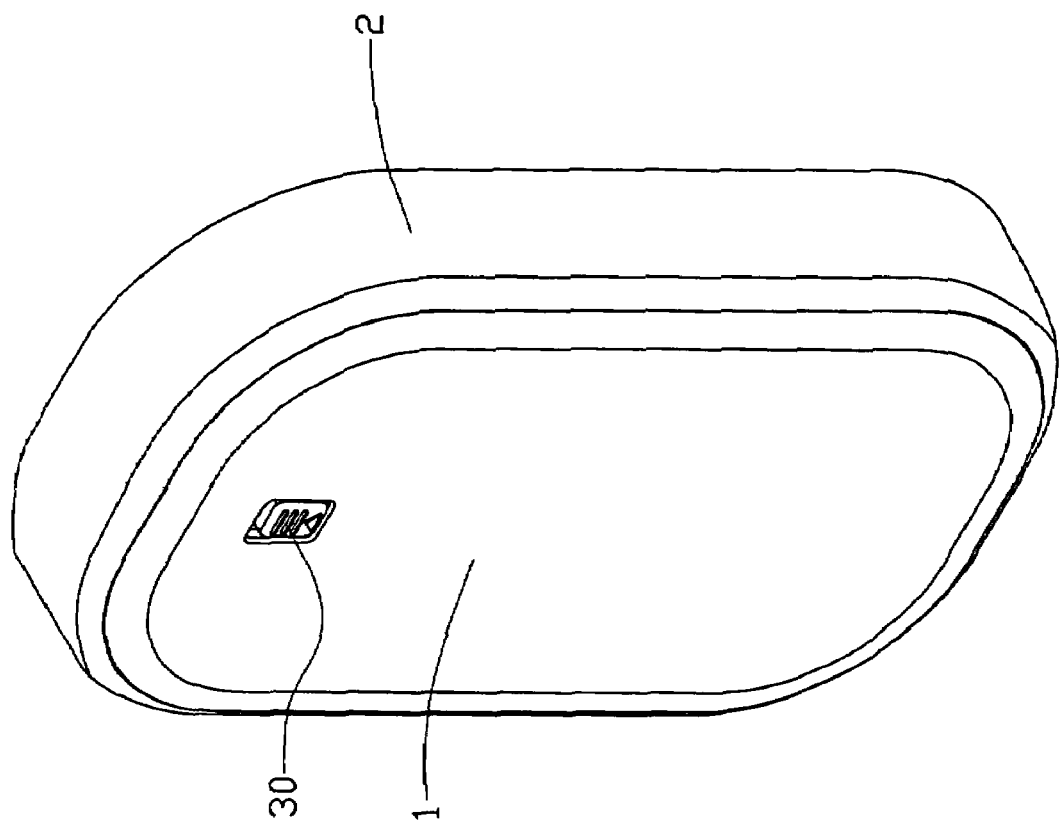
FIG. 5 is an assembled view of FIG. 2, but viewed from another aspect.

Referring to FIGS. 4 and 5, when assembling the cover 1 and the housing 2 together, firstly, the rearward claws 10 of the cover 1 are engaged in the slots 20 of the housing 2. Then the cover 1 is pushed toward the housing 2. The front claws 14 and the central claws 12 of the cover 1 are respectively engaged with the first clasps 342 and the second clasps 345 of the sliding frame 34, and the projection 302 of the block 30 extends through the opening 16 of the cover 1 and protrudes out from a front of the cover 1. The cover 1 is thereby assembled onto the housing 2 by the latching mechanism. When the cover 1 needs to be opened, the block 30 is pushed upward by a user. The block 30 forces the sliding frame 34 to slide relative to the holder 36 and the cover 1. The springs 32 are further stretched, and the first clasps 342 and the second clasps 345 of the sliding frame 34 respectively disengage from the front claws 14 and the central claws 12 of the cover 1. Thereby, the cover 1 can be readily released from the housing 2. Finally, the cover 1 is taken away from the housing 2 by a user. Thereupon, the springs 32 rebound, and the sliding frame 34 returns to its original position relative to the holder 36 under the elastic force of the springs 32.

In other exemplary embodiments, the springs 32 can be replaced by other elastic members such as rubber bars. The sliding frame 34 is not limited to having an inverted 'U' shape. For example, the sliding frame 34 can instead by a rectangular plate with suitable holes, slots and hooks. The block 30 and the sliding frame 34 can be a unitary component. That is, a protuberance such as a block can be integrally formed on the sliding frame 34. The holder 36 and the housing 2 can be manufactured as a unitary whole, or manufactured separately.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A battery cover fixing mechanism for coupling a cover to a housing of a portable electronic device, the battery cover fixing mechanism comprising:
   a blocking mechanism formed on the cover;
   an opening defined in the cover;
   a latching mechanism comprising a block, an elastic member, a slider having a blocking part, and a holder;
   a slot defined in the housing; and
   a cutout defined in the housing;
   wherein the holder is fixed to the housing, the slider is slidably attached on the holder, the block is fixed on the slider and extends through the cutout and the opening so as to be exposed to a user, the blocking mechanism of the cover engages in the slot of the housing and with the blocking part of the slider, one end of the elastic member is attached to the holder, and an opposite end of the elastic member is attached to the slider.

2. The battery cover fixing mechanism as claimed in claim 1, wherein the cover is a single piece of shaped sheet material having an inside surface and comprising a rearward section, a central section and a front section.

3. The battery cover fixing mechanism as claimed in claim 2, wherein the blocking mechanism of the cover comprises two rearward claws formed on the inside surface at the rearward section, two central claws formed on the inside surface at the central section, and two front claws formed on the inside surface at the front section.

4. The battery cover fixing mechanism as claimed in claim 3, wherein an end of each of the front claws and the central claws is chamfered.

5. The battery cover fixing mechanism as claimed in claim 3, wherein the housing defines a receptacle comprising three sidewalls, the slot is defined in one end of the cover, and the cutout is defined in the housing and faces the slot.

6. The battery cover fixing mechanism as claimed in claim 5, wherein the slider has an inverted 'U' shape, and has two side portions and a transverse portion perpendicularly interconnecting top ends of the side portions.

7. The battery cover fixing mechanism as claimed in claim 6, wherein the blocking part of the slider comprises a pair of first clasps formed on the transverse portion and a second clasp formed on each side portion, and the slider further has a first catch on each side portion.

8. The battery cover fixing mechanism as claimed in claim 6, wherein the slider forms a catch piece vertically on the transverse portion, and defines a pair of grooves on the transverse portion, and two tracks on each side portion.

9. The battery cover fixing mechanism as claimed in claim 8, wherein the slider defines two holes in the catch piece.

10. The battery cover fixing mechanism as claimed in claim 9, wherein the block forms two posts on one main surface thereof and a projection smaller than the opening of the housing on an opposite main surface thereof, and the two posts are inserted into the two holes of the slider.

11. The battery cover fixing mechanism as claimed in claim 7, wherein the housing has two slots, the rear claws are engaged in the slots of the housing, and the central claws and the front claws are respectively engaged with the second clasps of the slider and the first clasps of the slider.

12. The battery cover fixing mechanism as claimed in claim 8, wherein the holder comprises a plate, two sidepieces each having a tab and a second catch thereon, and a top piece vertical to the sidepieces, and the top piece has two inserting pieces thereon.

13. The battery cover fixing mechanism as claimed in claim 12, wherein the inserting pieces of the holder are inserted into the grooves of the slider, and the tabs of the holder are slidably inserted into the tracks of the slider.

14. The battery cover fixing mechanism as claimed in claim 12, wherein the elastic member comprises two springs each having two hooks on two ends thereof respectively, one hook of each spring is connected to the second catch of the holder, and the other hook of each spring is connected to the first catch of the slider.

15. A battery cover and housing assembly for a portable electronic device, the battery cover and housing assembly comprising:
   a housing having a slot and a cutout therein;
   a cover having a blocking mechanism and an opening; and
   a latching mechanism comprising a block, an elastic member, a slider having a blocking part, and a holder;
   wherein the holder is fixed to the housing, the slider is movably attached on the holder, the block is fixed on the slider and protrudes to another side of the housing and the cover through the cutout and the opening, the blocking mechanism of the cover engages in the slot of the housing and engages with the blocking part of the slider, one end of the elastic member is attached to the holder, and an opposite end of the elastic member is attached to the slider.

16. The battery cover and housing assembly as claimed in claim 15, wherein the cover is a single piece of shaped sheet material having an inside surface and comprising a rearward section, a central section and a front section.

17. The battery cover and housing assembly as claimed in claim 16, wherein the blocking mechanism of the cover comprises two rearward claws formed on the inside surface at the rearward section, two central claws formed on the inside surface at the central section, and two front claws formed on the inside surface at the front section.

18. The battery cover and housing assembly as claimed in claim 17, wherein the slider has an inverted 'U' shape, and has two side portions and a transverse portion perpendicularly interconnecting top ends of the side portions, the blocking part of the slider comprises a pair of first clasps formed on the transverse portion and a second clasp formed on each side portion, and the slider further forms has a first catch on each side portion.

19. The battery cover and housing assembly as claimed in claim 18, wherein the housing has two slots, the rear claws are engaged in the slots of the housing, and the central claws and the front claws are respectively engaged with the second clasps of the slider and the first clasps of the slider.

20. An electronic device comprising:
   a housing defining an opening at a side thereof so as to introduce an inner space thereof to an outside of said electronic device for accommodating a component of said electronic device in said inner space through said opening;
   a cover configured to be removably attachable to said housing and cover said opening for isolating said inner space and said accommodated component from said outside of said electronic device; and
   a latching mechanism comprising an elastic member, a slider having a blocking part, and a holder, said latching mechanism attachable to one of said housing and said cover, and defining a protrusion exposable to said outside of said electronic device for accepting a user's operation thereon, said latching mechanism releasably engageable with the other of said housing and said cover via at least two engagement means extending from said latching mechanism and having a different orientation from each other so as to fix said cover to said housing, and said user's operation on said protrusion leading to parallel movement of said latching mechanism to said side of said housing so as to disengage said at least two engagement means from said other of said housing and said cover for releasing said cover.

* * * * *